R. K. ADAMS.
HOISTING CRANE OR STACKER.
APPLICATION FILED SEPT. 20, 1919.

1,353,697.

Patented Sept. 21, 1920.
5 SHEETS—SHEET 1.

Witnesses
R. A. Thomas.

Inventor
Raymond K. Adams

By Victor J. Evans
Attorney

R. K. ADAMS.
HOISTING CRANE OR STACKER.
APPLICATION FILED SEPT. 20, 1919.
1,353,697.
Patented Sept. 21, 1920.
5 SHEETS—SHEET 3.
Fig. 3.
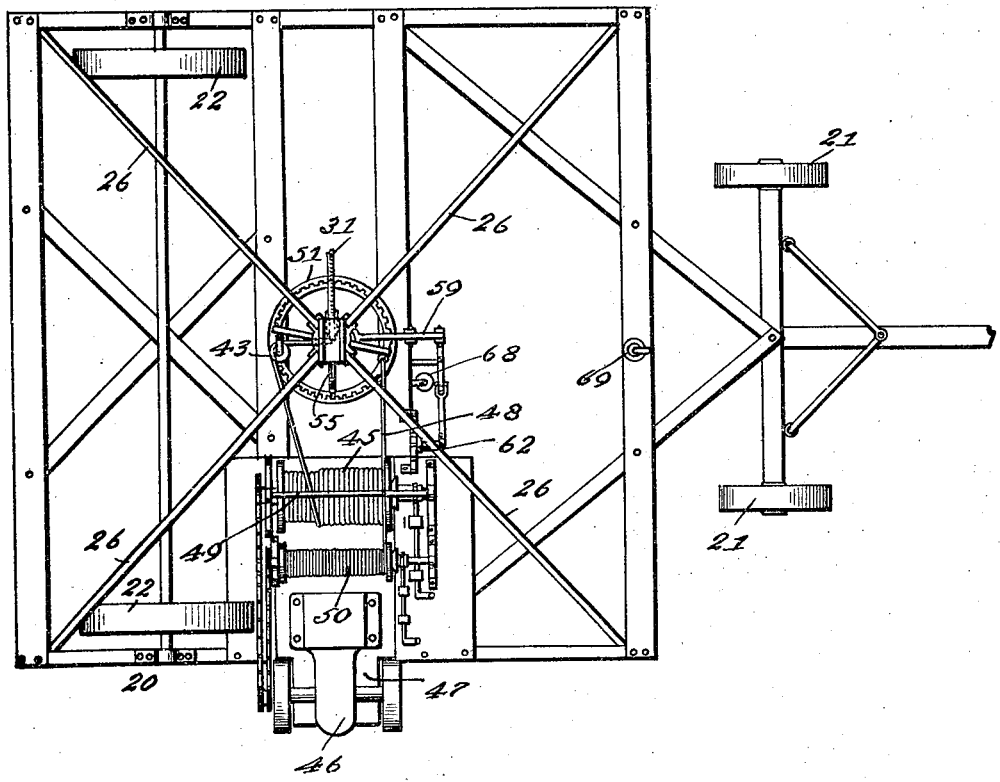
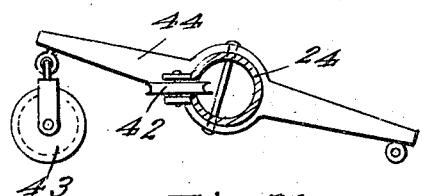
Fig. 11.
Witnesses
H. A. Thomas
Inventor
Raymond K Adams
By Victor J. Evans
Attorney

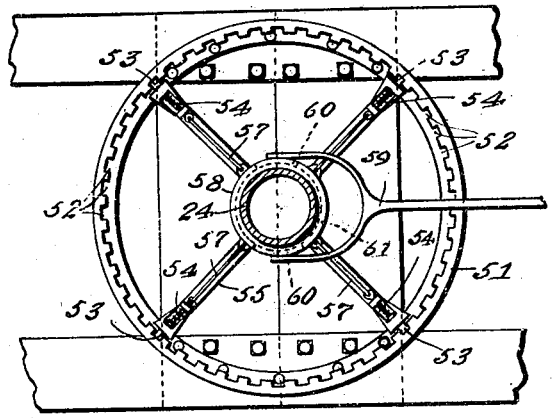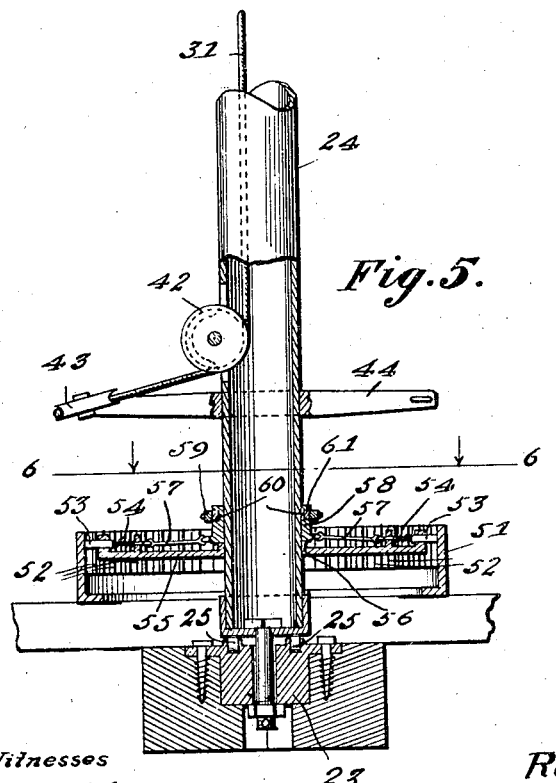

R. K. ADAMS.
HOISTING CRANE OR STACKER.
APPLICATION FILED SEPT. 20, 1919.
1,353,697.
Patented Sept. 21, 1920.
5 SHEETS—SHEET 5.
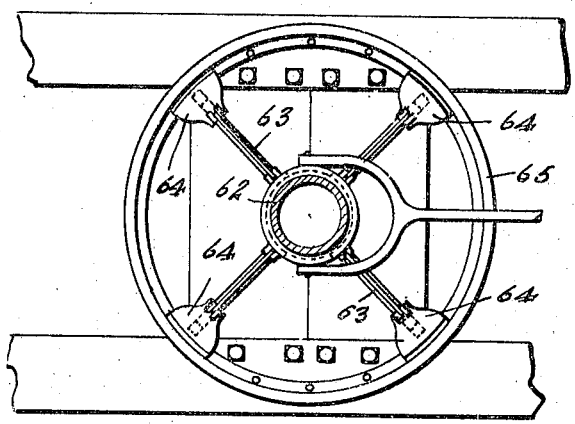
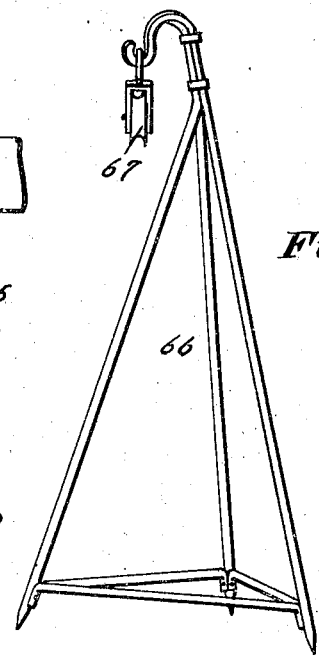
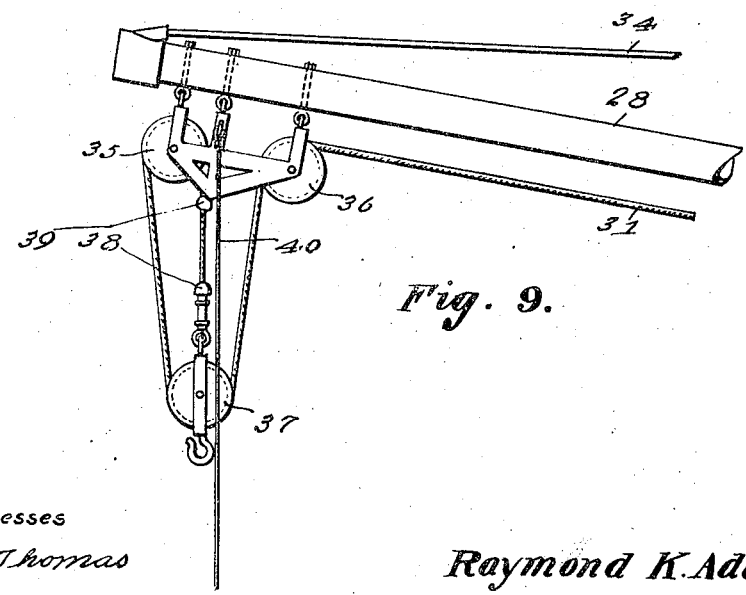
Witnesses
R. A. Thomas
Inventor
Raymond K. Adams
By Victor J. Evans
Attorney

UNITED STATES PATENT OFFICE.

RAYMOND K. ADAMS, OF DWYER, WYOMING.

HOISTING-CRANE OR STACKER.

1,353,697.

Specification of Letters Patent.    Patented Sept. 21, 1920.

Application filed September 20, 1919. Serial No. 325,089.

*To all whom it may concern:*

Be it known that I, RAYMOND K. ADAMS, a citizen of the United States, residing at Dwyer, in the county of Platte and State of Wyoming, have invented new and useful Improvements in Hoisting-Cranes or Stackers, of which the following is a specification.

The object of the invention is to provide a simple and relatively inexpensive and efficient portable hoisting crane or stacker, adapted for general use on a farm and in handling machinery and other heavy objects in loading, unloading and the like, the parts being so related as to facilitate the control and operation thereof with the minimum number of attendants and with the minimum effort on their part.

With these and related objects in view, the invention consists in a construction, combination and relation of parts hereinafter specifically set forth, it being understood that changes in the form, proportion and details may be resorted to within the scope of the appended claims without departing from the spirit of the invention.

In the drawings:

Fig. 3 is a plan view, the crane arm being omitted;

Fig. 4 is a plan view of the crane arm and related parts;

Fig. 5 is a detail view partly in section of the lower portion of the crane post and the connections therewith including the means whereby the crane is locked in its adjusted position;

Fig. 6 is a detail plan view of the locking mechanism and related parts, the post being shown in transverse section on the plane indicated by the line 6—6 of Fig. 5;

Fig. 7 is a detail view of a jack used in raising and lowering the front end of the base of the crane in connection with the removal and replacement of the front wheels thereof;

Fig. 8 is a plan view of a modified form of device for locking the crane in its adjusted position;

Fig. 9 is a detail view of the outer end of the crane arm and the guides for the hoisting cable.

Fig. 10 is a detail view of the lock for securing the running pulley in its elevated position;

Fig. 11 is a sectional view through the crane post looking directly upon the cross head, and showing the arrangement of the direction pulley carried by the crane post and the traction pulley carried by the cross head.

Figure 1:
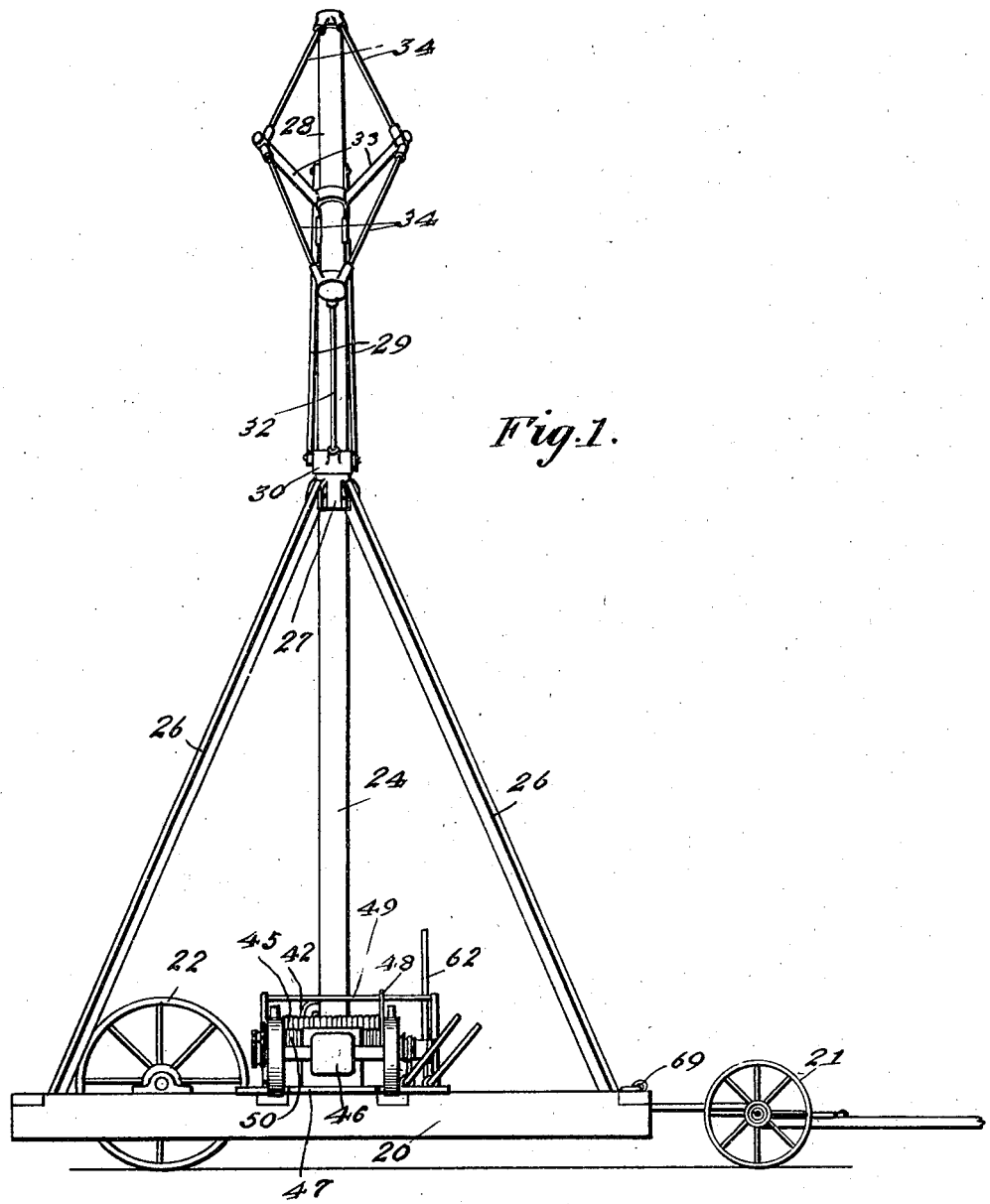
Figure 1 is a side view of the apparatus.
Figure 2:
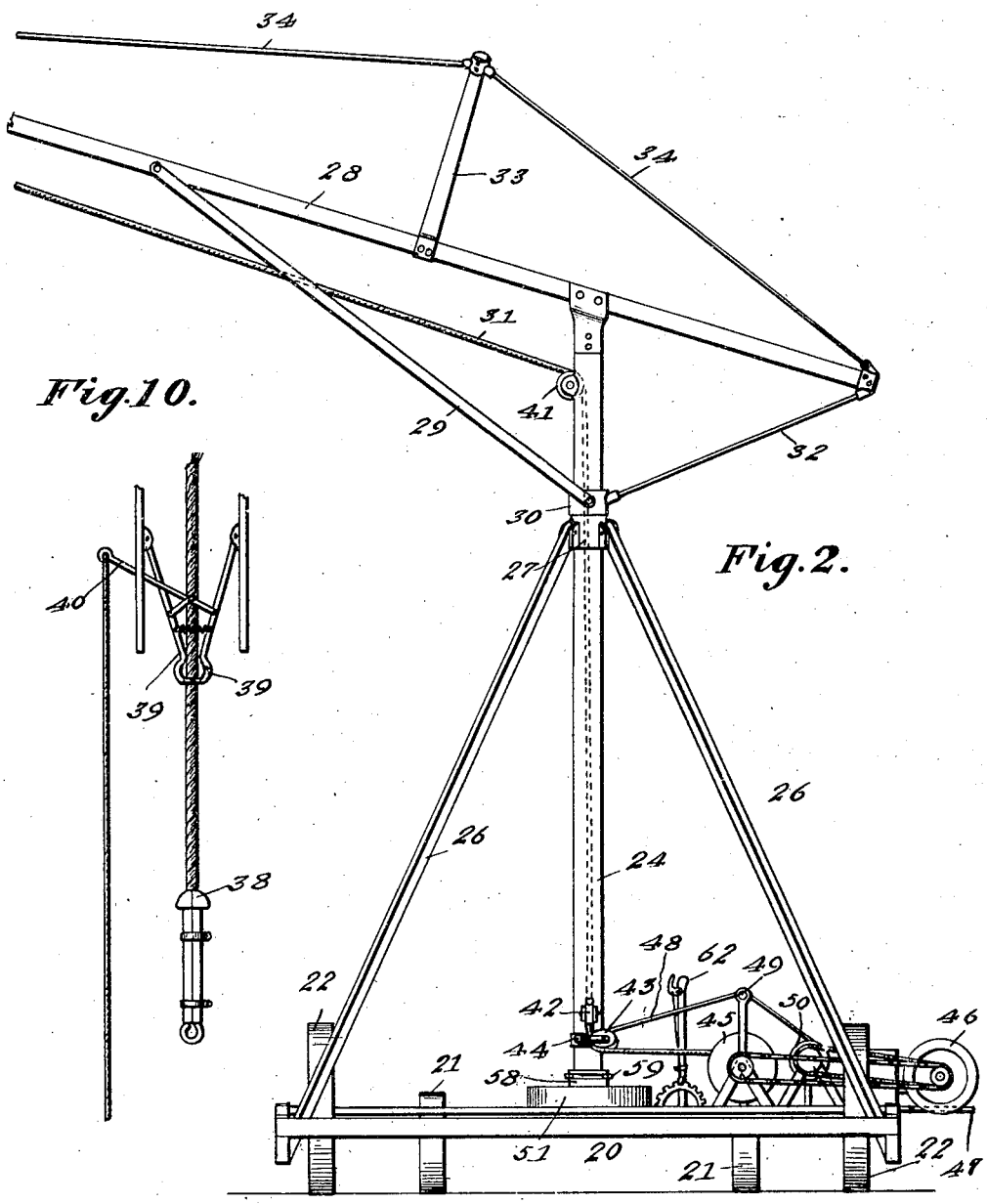
Fig. 2 is an end view of the same.

The base 20 of the apparatus is preferably supported for transportation upon front and rear wheels 21 and 22 of which the former are preferably removed when the crane is to be used, and holes are dug in the ground for the rear wheels so as to bring the bottom of the base into contact with the ground and thus afford a firm foundation for the structure. Rising from a central steering block or turn table 23 is the crane post 24, preferably of tubular construction, and having bearing rollers 25 at its lower end so as to facilitate the turning thereof. This crane post is held in an upright position for revoluble movement by means of braces 26 which extend upward from the corners of the base frame and are connected at their upper ends to a collar 27 within which the post is turned. The crane arm consists of a boom 28 having lateral braces 29 which extend through a collar 30, fitted upon the post above the collar 27, said braces being arranged at either side of the plane of the boom so as to permit of the passage therebetween of the hoisting cable 31. A rear brace 32 extends to the rear end of the boom, and truss braces for the stiffening of the boom consist of the thrusts 33 extendnig upwardly and outwardly from intermediate portions of the boom and connected by the extension rods 34.

The hoisting cable may be provided at the free end of the crane arm with the usual direction pulleys 35 and 36 and the traveling pulleys 37 which may be locked in its elevated position by a clutch mechanism as is now used in connection with hay links and the like, or such as indicated Figs. 9 and 10 of the drawings, a head 38 on the traveling pulleys being adapted for engagement by clamp members 39 which may be opened to release the head by means of a trip 40. Near the lower end of the crane post, the hoisting cable which passes downward therethrough after traversing a direction pulley 41 is carried outward around a direction pulley 42 and around a traction pulley 43 on one arm of a cross head 44 secured to the post, and thence to a drum 45 actuated by an engine 46 or similar suitable power mechanism, the hoisting mechanism including the drum and engine preferably being supported by a separate head 47 which while normally seated upon the base 20 is removable therefrom to permit of the use thereof independently of the crane.

From the other extremity of the cross head 44 an operating cable 48 extends through a guide 49 and thence to a drum 50, and by means of the relative operation of the drums 45 and 50 the load carrying pulley 37 being in its locked position, the crane post may be turned in either direction to move the crane arm so that the load may be deposited as may be desired.

In connection with the above described mechanism there is employed locking means for securing the crane post with the crane arm in adjusted position, consisting for example of a stop rim 51, secured in a fixed position to the base and having a plurality of seats or sockets 52 for engagement by latches 53 actuated respectively by springs 54 and carried by the arm 55 of a spider of which the hub 56 is secured to the crane post in the plane of the stop rim. The latches are connected by draw rods or wires 57 with a collar 58 which is mounted to slide upon the crane post and is adjustable by means of a lever 59 having shoes 60 to engage an annular groove 61 in said collar. The elevation of the collar by means of a hand lever 62 within easy reach of the operator, will withdraw the latches 53 to release the crane post and permit of its rotary movement to swing the crane arm as may be required through the agency of the drums 45 and 50 acting through the cables 31 and 48, and when the collar is permitted to descend, the latches engage in the sockets of the stop rim and hold the crane in the position necessary for elevating or lowering the load carried by the hoisting cable. A modified construction of means for locking the crane in adjusted position best illustrated in Fig. 8, of the drawings, wherein the crane post 62 carries radial arms 63 having terminal shoes 64 around which extends a straight band 65, adapted to be tightened or loosened by any suitable or well known means capable of operation at any point in the travel of the crane arm through its arc which preferably is of an extent of approximately 180 degrees.

In raising and lowering the front end of the crane in connection with the operations of removing and replacing the front wheels, a jack as indicated in Fig. 7 may be employed the same consisting of a frame 66 supporting a direction pulley 67 around which may extend the cable 28 ordinarily connected with an arm of the cross head 44, after passing through a direction pulley 68 indicated in Figs. 1 and 3 and being terminally attached to the front cross beam of the frame as at 69.

From the foregoing description it will be obvious that while a crane of the construction indicated may be readily transported from place to place, it being preferable to detach the crane arm during such movement, it may be readily manipulated in the elevation and handling of heavy loads as in stacking, moving machinery and the like, the means for elevating the load and swinging the crane arm being within the control of the operator through the agency provided for actuating the drums of which one controls the hoisting cable and operates solely as a part of the hoisting mechanism when the crane post is locked against revoluble movement.

Having described the invention what I claim as new is :—

1. A hoisting mechanism of the class described having a base, a crane post revolubly mounted thereon, a crane arm carried by the post, a hoisting cable, means for securing the post against revoluble movement, a cross head having at one end a guide for said hoisting cable, a supplemental cable connected with the other arm of the cross head, and hoisting mechanism having independent drums for said hoisting and said supplemental cables.

2. A hoisting mechanism of the class described having a base, a revoluble tubular crane post, a crane arm carried by the post, a hoisting cable extending through said crane post, and provided at its upper and lower ends with direction pulleys, a cross head having on one arm a guide pulley for said hoisting cable, a supplemental cable connected with the other arm of the cross head, locking mechanism for securing the crane post in its adjusted position against revoluble movement and hoisting mechanism including independent cables, independent drums respectively for said hoisting and supplemental cables.

3. A hoisting apparatus of the class described having a base, a revoluble crane post and a crane arm carried thereby, a hoisting cable, a cross head having one of its arms provided with a guide for said hoisting cable, a supplemental cable connected with the other arm of the cross head, hoisting mechanism having reeling elements for respectively actuating said hoisting and supplemental cables and provided with a base removably mounted upon said first mentioned base.

4. A hoisting mechanism of the class described, having a base, a crane post revolubly mounted upon the base, and supporting a crane arm, a hoisting cable, hoisting mechanism connected with the cable, a stop rim disposed eccentrically with relation to the crane post and provided with a plurality of seats or sockets, a spider carried by the post in the plane of the stop rim and provided with latches for engagement with said seats or sockets, a collar slidably mounted upon the crane post and connected with said latches and means for actuating said collar to withdraw the latches from engagement with said stop rim.

5. A hoisting mechanism of the class described having a base, a revoluble crane post mounted thereon, and carrying a crane arm, a hoisting cable, a cross head having at one end a guide for said hoisting cable, a supplemental cable connected with the other arm of the cross head, hoisting mechanism having drums for respective actuation of said hoisting and supplemental cables, a stop rim eccentric with the crane post and having a plurality of seats or sockets, a spider secured to the crane post and having its arms provided with terminal latches for engagement with said seats or sockets, and a collar slidably mounted upon the crane post and having connections with said latches for withdrawing the latter from engagement with the stop rim.

In testimony whereof I affix my signature.

RAYMOND K. ADAMS.